United States Patent
Mayne et al.

(10) Patent No.: US 11,565,819 B2
(45) Date of Patent: Jan. 31, 2023

(54) DYNAMIC ELECTRO-MECHANICAL OTTOMAN

(71) Applicant: Rockwell Collins, Inc., Cedar Rapids, IA (US)

(72) Inventors: Peter Mayne, London (GB); Daniel Flashman, London (GB); Aaron D. LaPrade, Winston-Salem, NC (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 1129 days.

(21) Appl. No.: 16/174,578

(22) Filed: Oct. 30, 2018

(65) Prior Publication Data

US 2020/0130846 A1    Apr. 30, 2020

(51) Int. Cl.
 *B64D 11/06* (2006.01)
(52) U.S. Cl.
 CPC ...... *B64D 11/0643* (2014.12); *B64D 11/0604* (2014.12); *B64D 11/064* (2014.12); *B64D 11/0647* (2014.12)
(58) Field of Classification Search
 CPC ............ B64D 11/0604; B64D 11/0643; B64D 11/0647
 See application file for complete search history.

(56) References Cited

U.S. PATENT DOCUMENTS

| | | | |
|---|---|---|---|
| 6,352,309 B1 * | 3/2002 | Beroth ................. | B64D 11/064 297/284.11 |
| 6,636,197 B1 * | 10/2003 | Goldenberg ............ | G06F 3/016 345/184 |
| 2008/0143137 A1 * | 6/2008 | Bowen ................... | B60N 3/063 296/75 |
| 2021/0214088 A1 * | 7/2021 | Kigoshi ............... | B64D 11/064 |

FOREIGN PATENT DOCUMENTS

| | | |
|---|---|---|
| DE | 102006007854 A1 | 8/2007 |
| EP | 1116654 A2 | 7/2001 |
| JP | 2019018622 A | 2/2019 |
| WO | 03004305 A1 | 1/2003 |

OTHER PUBLICATIONS

Extended Search Report for European Application No. 21188567.8 dated Dec. 7, 2021, 6 pages.
Search Report dated Apr. 6, 2020 for EP Application No. 19206343.6.

* cited by examiner

*Primary Examiner* — Nicholas McFall
(74) *Attorney, Agent, or Firm* — Suiter Swantz pc llo

(57) ABSTRACT

A dynamic electro-mechanical ottoman may include a rail assembly with one or more actuatable tracks coupled to one or more rails. The dynamic electro-mechanical ottoman may include a cushion assembly translatable via the one or more actuatable tracks between a first translation position and a second translation position. The cushion assembly may include one or more cross plates coupled to a pivot shaft and the one or more actuatable tracks, and a cushion sub-assembly. The cushion sub-assembly may include one or more support plates coupled to a cushion and the pivot shaft, and may be rotatable about an axis through the pivot shaft between a first rotation position and a second rotation position. A top surface of the cushion may at least partially face an aircraft seat when the cushion sub-assembly is in the second rotation position.

18 Claims, 11 Drawing Sheets

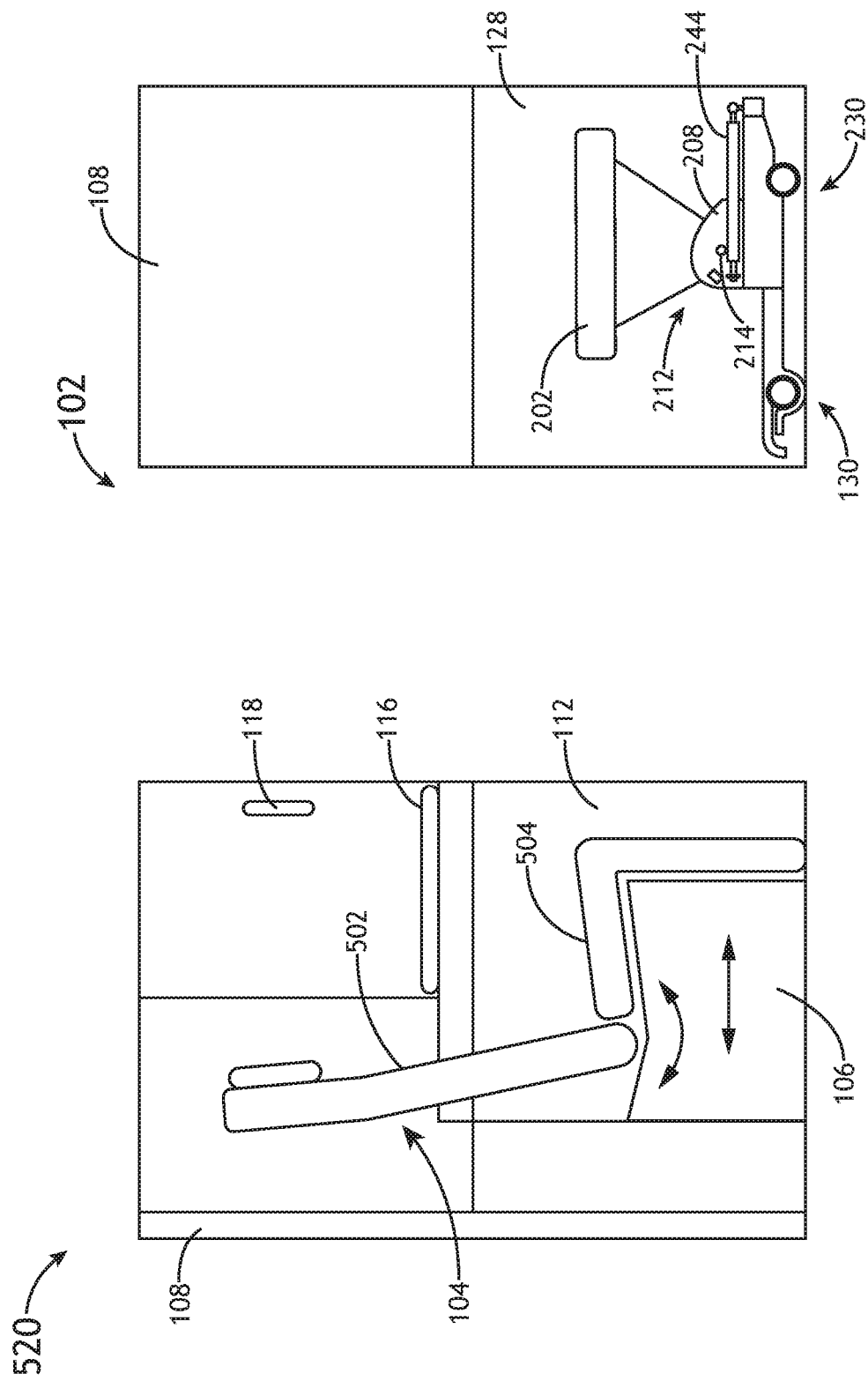

DYNAMIC ELECTRO-MECHANICAL OTTOMAN

BACKGROUND OF THE INVENTION

Select passenger aircraft include main cabin premium areas (e.g., business-class areas or first-class areas), where the main cabin premium areas include partitioned areas and/or premium enclosed compartments. The premium areas may include amenities such as, but not limited to, convertible aircraft seats (e.g., reclining seats, lay-flat seats including a bed mode, or the like), in-flight entertainment (IFE) devices (e.g., displays, or the like), and/or passenger trays that can be used when passengers want to eat, drink, read, write, and/or use portable devices (e.g., laptops, tablets, or the like).

During very long travel (e.g., transoceanic or other long-haul flights), a passenger may wish to recline the convertible aircraft seat and/or utilize the convertible aircraft seat in the bed mode (e.g., in the lay-flat position). The sleeping area of the convertible aircraft seat in bed mode, however, may be limited to the dimensions of the convertible aircraft seat (e.g., the combined length of a seat back cushion and a seat cushion of the convertible aircraft seat), which may not be enough for select passengers.

Airlines may wish to provide passengers occupying the main cabin premium areas with a foot rest proximate to the convertible aircraft seats. The foot rest may be positionable relative to the passenger. The positioning of the foot rest may be dependent on the movement and/or location of the convertible aircraft seat.

Therefore, it would be advantageous to provide a solution that cures the shortcomings described above.

SUMMARY

In one aspect, embodiments of the inventive concepts disclosed herein are directed to a dynamic electro-mechanical ottoman for an aircraft. The dynamic electro-mechanical ottoman may include a rail assembly. The rail assembly may include one or more rails. The rail assembly may include one or more actuatable tracks coupled to the one or more rails. The dynamic electro-mechanical ottoman may include a cushion assembly translatable via the one or more actuatable tracks between a first translation position and a second translation position. The cushion assembly may include one or more cross plates coupled to the one or more actuatable tracks. The cushion assembly may include a pivot shaft coupled to the one or more cross plates. The cushion assembly may include a cushion sub-assembly. The cushion sub-assembly may include one or more support plates coupled to the pivot shaft. The cushion sub-assembly may include a cushion coupled to the one or more support plates. The cushion sub-assembly may be rotatable about an axis through the pivot shaft between a first rotation position and a second rotation position. A top surface of the cushion may at least partially face an aircraft seat when the cushion sub-assembly is in the second rotation position.

In an additional aspect, embodiments of the inventive concepts disclosed herein are directed to a passenger compartment for an aircraft. The passenger compartment may include an aircraft seat. The passenger compartment may include a dynamic electro-mechanical ottoman. The dynamic electro-mechanical ottoman may include a rail assembly. The rail assembly may include one or more rails. The rail assembly may include one or more actuatable tracks coupled to the one or more rails. The dynamic electro-mechanical ottoman may include a cushion assembly translatable via the one or more actuatable tracks between a first translation position and a second translation position. The cushion assembly may include one or more cross plates coupled to the one or more actuatable tracks. The cushion assembly may include a pivot shaft coupled to the one or more cross plates. The cushion assembly may include a cushion sub-assembly. The cushion sub-assembly may include one or more support plates coupled to the pivot shaft. The cushion sub-assembly may include a cushion coupled to the one or more support plates. The cushion sub-assembly may be rotatable about an axis through the pivot shaft between a first rotation position and a second rotation position. A top surface of the cushion may at least partially face the aircraft seat when the cushion sub-assembly is in the second rotation position.

In a further aspect, embodiments of the inventive concepts disclosed herein are directed to a dynamic electro-mechanical ottoman. The dynamic electro-mechanical ottoman may include a rail assembly. The rail assembly may include one or more rails. The rail assembly may include one or more actuatable tracks coupled to the one or more rails. The dynamic electro-mechanical ottoman may include a cushion assembly translatable via the one or more actuatable tracks between a first translation position and a second translation position. The cushion assembly may include one or more cross plates coupled to the one or more actuatable tracks. The cushion assembly may include a pivot shaft coupled to the one or more cross plates. The cushion assembly may include a cushion sub-assembly. The cushion sub-assembly may include one or more support plates coupled to the pivot shaft. The cushion sub-assembly may include a cushion coupled to the one or more support plates. The cushion sub-assembly may be rotatable about an axis through the pivot shaft between a first rotation position and a second rotation position. A top surface of the cushion may at least partially face a seat when the cushion sub-assembly is in the second rotation position.

It is to be understood that both the foregoing general description and the following detailed description are exemplary and explanatory only and are not necessarily restrictive of the present disclosure. The accompanying drawings, which are incorporated in and constitute a part of the characteristic, illustrate subject matter of the disclosure. Together, the descriptions and the drawings serve to explain the principles of the disclosure.

BRIEF DESCRIPTION OF THE DRAWINGS

Implementations of the inventive concepts disclosed herein may be better understood when consideration is given to the following detailed description thereof. Such description makes reference to the included drawings, which are not necessarily to scale, and in which some features may be exaggerated and some features may be omitted or may be represented schematically in the interest of clarity. Like reference numerals in the drawings may represent and refer to the same or similar element, feature, or function. In the drawings:

FIG. 5C is a side view of an exemplary embodiment of a passenger compartment including an aircraft seat and a dynamic electro-mechanical ottoman, in accordance with the inventive concepts disclosed herein.

DETAILED DESCRIPTION OF EXEMPLARY EMBODIMENTS

Figure 1A:
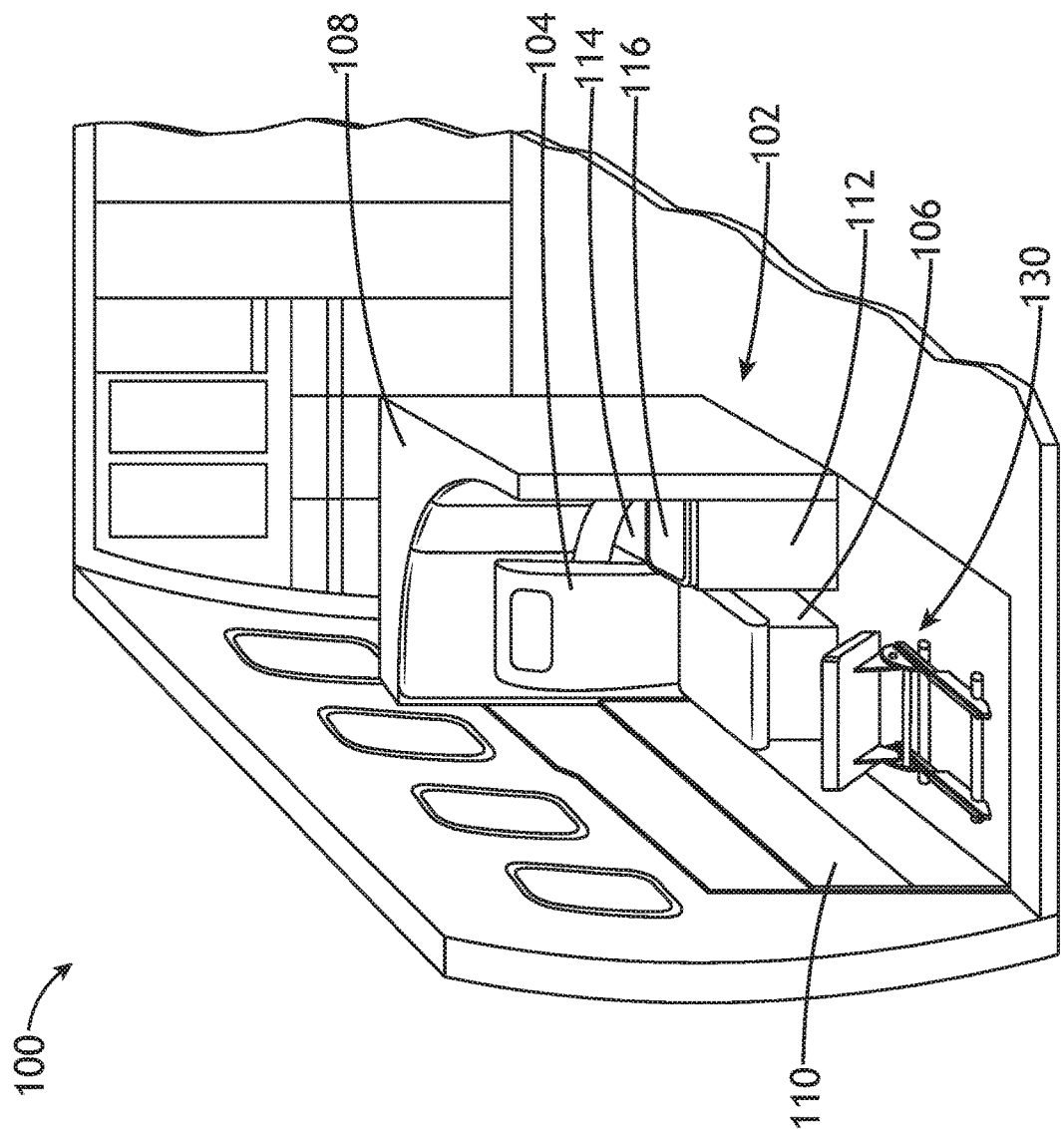
FIG. 1A is a perspective view of an exemplary embodiment of an aviation environment in which a passenger compartment including an aircraft seat and a dynamic electro-mechanical ottoman may be implemented, in accordance with the inventive concepts disclosed herein.

Reference will now be made in detail to the subject matter disclosed, which is illustrated in the accompanying drawings.

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only and should not be construed to limit the inventive concepts disclosed herein in any way unless expressly stated to the contrary.

In addition, use of the "a" or "an" are employed to describe elements and components of embodiments of the instant inventive concepts. This is done merely for convenience and to give a general sense of the inventive concepts, and "a" and "an" are intended to include one or at least one and the singular also includes the plural unless it is obvious that it is meant otherwise.

Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

Further, any arrangement of components to achieve a same functionality is effectively "associated" such that the desired functionality is achieved, such that any two components herein combined to achieve a particular functionality can be seen as "associated with" each other (irrespective of architectures or intermedial components). Any two components so associated can also be viewed as being "operably connected" or "operably coupled" to each other to achieve the desired functionality, and any two components capable of being so associated can also be viewed as being "operably couplable" to each other to achieve the desired functionality. Examples of operably couplable include, but are not limited to, physically mateable and/or physically interacting components, wirelessly interactable and/or wirelessly interacting components, logically interacting and/or logically interactable components, or the like.

Further, one or more components may be referred to herein as "configured to," "configurable to," "operable/operative to," "adapted/adaptable," "able to," "conformable/conformed to," etc. Those skilled in the art will recognize that such terms (e.g., "configured to") can generally encompass active-state components and/or inactive-state components and/or standby-state components, unless context requires otherwise.

Finally, as used herein any reference to "one embodiment," or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination of or sub-combination of two or more such features, along with any other features which may not necessarily be expressly described or inherently present in the instant disclosure.

FIGS. 1A-5D generally illustrate exemplary embodiments of a dynamic retention system for an aircraft seat in accordance with the inventive concepts disclosed herein.

Broadly, embodiments of the inventive concepts disclosed herein are directed to a dynamic electro-mechanical ottoman. More particularly, embodiments of the inventive concepts disclosed herein are directed to a dynamic electro-mechanical ottoman configured to be positionable relative to a passenger in a convertible aircraft seat, where the positioning may be dependent on a movement and/or location of the convertible aircraft seat.

It is noted herein the dynamic electro-mechanical ottoman may be implemented in any environment of a number of environments. For example, the environment may include any type of vehicle known in the art. For instance, the vehicle may be any air, land, or water-based personal equipment or vehicle; any air, land, or water-based commercial equipment or vehicle; any air, land, or water-based military equipment or vehicle known in the art. By way of another example, the environment may include a commercial or industrial establishment (e.g., a home or a business).

Where the environment is an aviation environment, the dynamic electro-mechanical ottoman may be configured in accordance with aviation guidelines and/or standards put forth by, but not limited to, the Federal Aviation Administration (FAA), the European Aviation Safety Agency (EASA) or any other flight certification agency or organization; the American National Standards Institute (ANSI), Aeronautical Radio, Incorporated (ARINC), or any other standards setting organization or company; the Radio Technical Commission for Aeronautics (RTCA) or any other guidelines agency or organization; or the like.

Figure 1B:
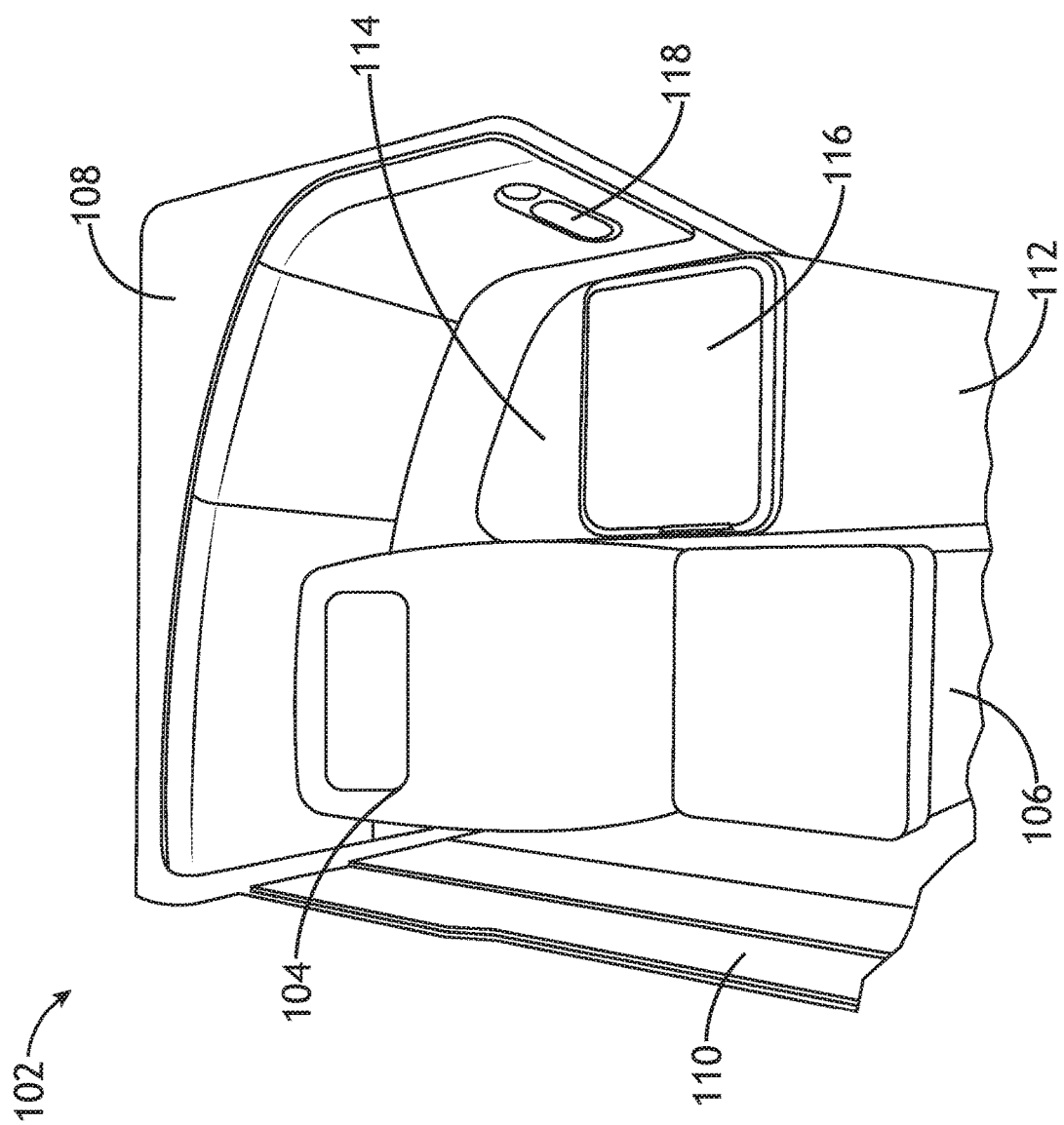
FIG. 1B is a perspective view of an exemplary embodiment of a passenger compartment including an aircraft seat and a dynamic electro-mechanical ottoman, in accordance with the inventive concepts disclosed herein.
Figure 1C:
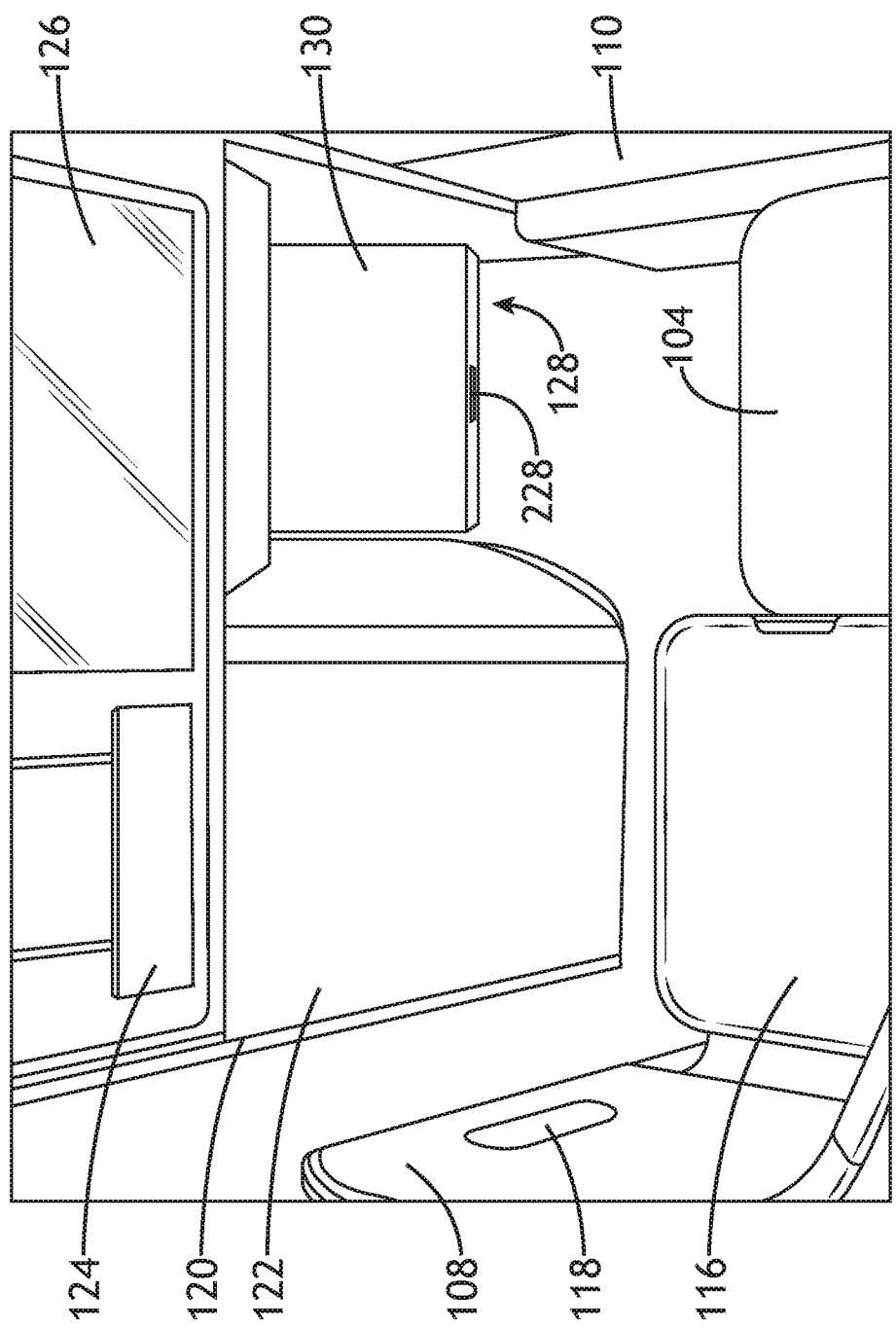
FIG. 1C is a partial perspective view of an exemplary embodiment of a passenger compartment including an aircraft seat and a dynamic electro-mechanical ottoman, in accordance with the inventive concepts disclosed herein.

FIG. 1A-1C illustrates exemplary embodiments of an aviation environment 100 including an enclosed passenger compartment 102, in accordance with the inventive concepts disclosed herein. For example, the aviation environment 100 may include, but is not limited to, an aircraft cabin 100.

The passenger compartment 102 may include one or more aircraft seats 104. For example, an aircraft seat 104 may include a seat back, a seat, and/or one or more arms. The aircraft seat 104 may include a base 106. For example, the base 106 may be coupled to one or more floor fittings within a floor of the aircraft cabin 100. By way of another example, the base 106 may be exposed and/or at least partially covered by a shroud. For instance, the shroud may be formed from one or more shroud sections.

The aircraft seat 104 may be translatable (e.g., trackable or slidable) along an axis length-wise relative to the aviation environment 100 into a position including, but not limited to, a fore position and/or an aft position. The aircraft seat 104 may be rotatable about an axis cross-wise through the aircraft seat 104 into a position including, but not limited to, an upright or raised position, a reclined position, and/or a lay-flat or bed position. The aircraft seat 104 may be rotatable about an axis (e.g., swivelable) through the aircraft seat 104 and the base 106 into a position including, but not limited to, an inboard position, a forward-facing position (or rear-facing position, depending on seat placement within the passenger compartment 102), and/or an outboard position. The aircraft seat 104 may be fully positionable between the outer limits of motion as defined by the moveable components of the aircraft seat 104, the base 106, and/or other fixed components of the passenger compartment 102.

It is noted herein a combination of a fully upright position, a fully aft (or fully fore position, depending on seat placement within the passenger compartment 102) position, and a fully forward-facing position (or fully rear-facing position, depending on seat placement within the passenger compartment 102) may be considered a taxi, takeoff, or landing (TTOL) position during select stages of flight, for purposes of the present disclosure. In addition, it is noted herein that any position that does not meet the above-defined requirements of the TTOL position may be considered a non-TTOL position, for purposes of the present disclosure. Further, it is noted herein the aircraft seat 104 may be translatable and/or rotatable from the TTOL position to a non-TTOL position, and/or vice versa.

The passenger compartment 102 may include a set of bulkheads 108. It is noted herein that the passenger compartment 102 is illustrated in FIG. 1A as without a front bulkhead 108 and/or a portion of a side bulkhead 108 for purposes of clarity only, and should not be interpreted as a limitation on the present disclosure but merely an illustration.

The passenger compartment 102 may include one or more partitions 110. For example, the one or more partitions 110 may be a vertically translating privacy divider. Although not shown, the one or more partitions 110 may provide a private space and/or a communal area between multiple passengers within the passenger compartment 102 where the passenger compartment 102 includes multiple seats 104.

The passenger compartment 102 may include one or more monuments 112 (e.g., side stand, table, or the like). A monument 112 may include an accessible surface 114 for the passenger. An actuatable tray 116 (e.g., translatable, foldable, extendable, or the like) may be positioned proximate to the accessible surface 114 (e.g., on top, in front, underneath in a cavity defined by a space within the monument 112, or the like).

The passenger compartment 102 may include one or more lights 118. For example, the one or more lights 118 may be positioned proximate to the one or more bulkheads 108 (e.g., positioned on the accessible surface 114). By way of another example, the one or more lights 118 may be secured to and/or at least partially inset within the one or more bulkheads 108.

The passenger compartment 102 may include one or more stowage compartments 120, 122. For example, a stowage compartment 120 may include a door 124, and may be configured to receive and hold (e.g., contain, secure, or the like) one or more pieces of carry-on luggage. By way of another example, a stowage compartment 122 may be configured to receive paper-printed materials (e.g., magazines, newspapers, pamphlets, or the like), select personal electronic devices (e.g., phones, tablets, phablets, laptops, music devices, digital video disc (DVD) players, handheld gaming consoles or devices, or the like), passenger amenities, or the like. The one or more stowage compartments 120, 122 may be secured to and/or at least partially inset within the one or more bulkheads 108, the one or more monuments 112, or the like.

The passenger compartment 102 may include one or more passenger in-flight entertainment devices (IFEs). For example, the one or more IFEs may include, but are not limited to, one or more displays 126 secured to and/or at least partially inset within a bulkhead 108.

The passenger compartment 102 may include a footwell 128 for a passenger. For example, the footwell 128 may be positioned across from the aircraft seat 104 within the passenger compartment 102. The passenger compartment 102 may include a dynamic electro-mechanical ottoman 130. For example, the ottoman 130 may be positioned within the footwell 128. By way of another example, the ottoman 130 may be actuatable to a position outside of the footwell 128. It is noted herein the ottoman 130 may be integrated into existing passenger compartments 102. In addition, it is noted herein the ottoman 130 may be configured to be operable in conjunction with existing convertible aircraft seat systems known in the art.

Figure 2A:
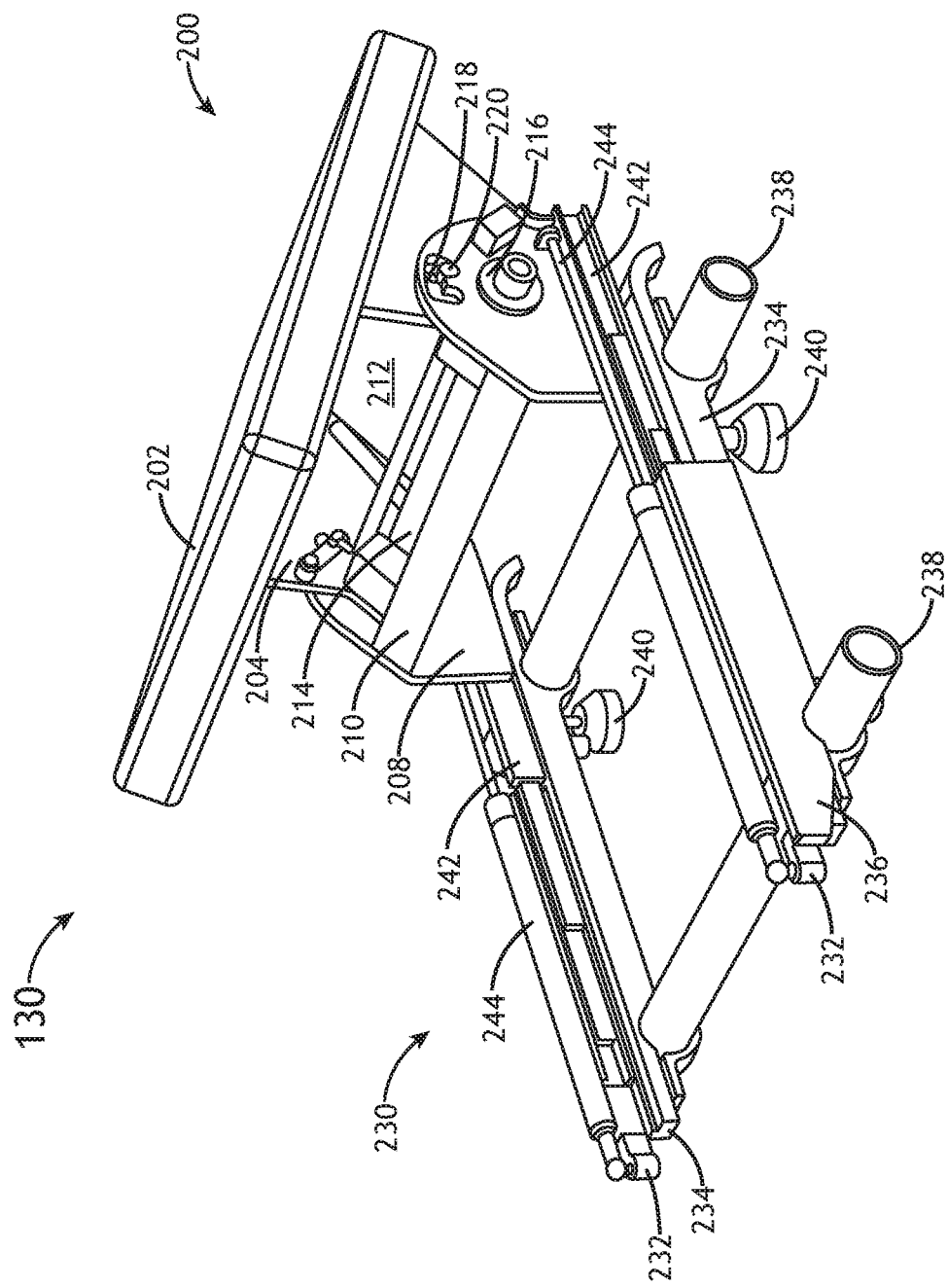
FIG. 2A is a perspective view of an exemplary embodiment of a dynamic electro-mechanical ottoman, in accordance with the inventive concepts disclosed herein.
Figure 2C:
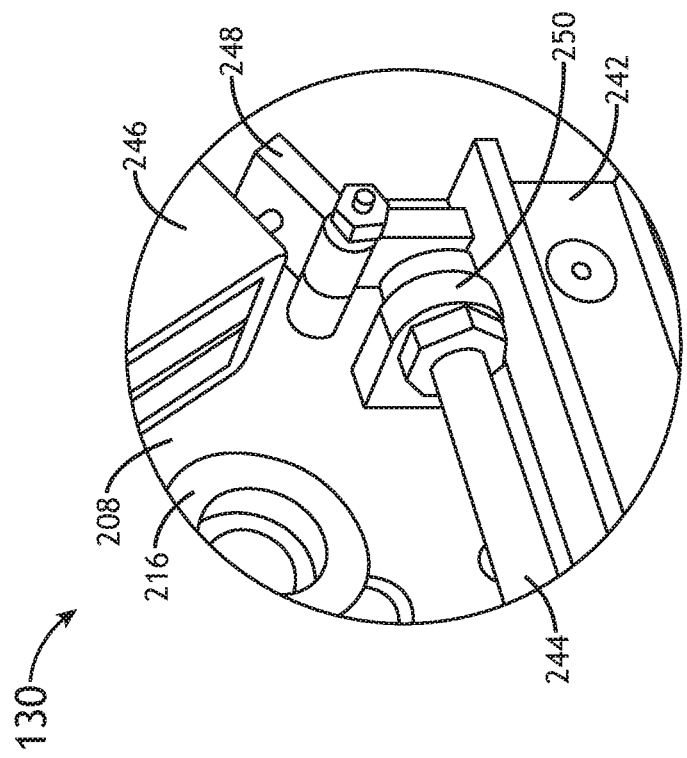
FIG. 2C is a partial perspective view of an exemplary embodiment of a dynamic electro-mechanical ottoman, in accordance with the inventive concepts disclosed herein.
Figure 2B:
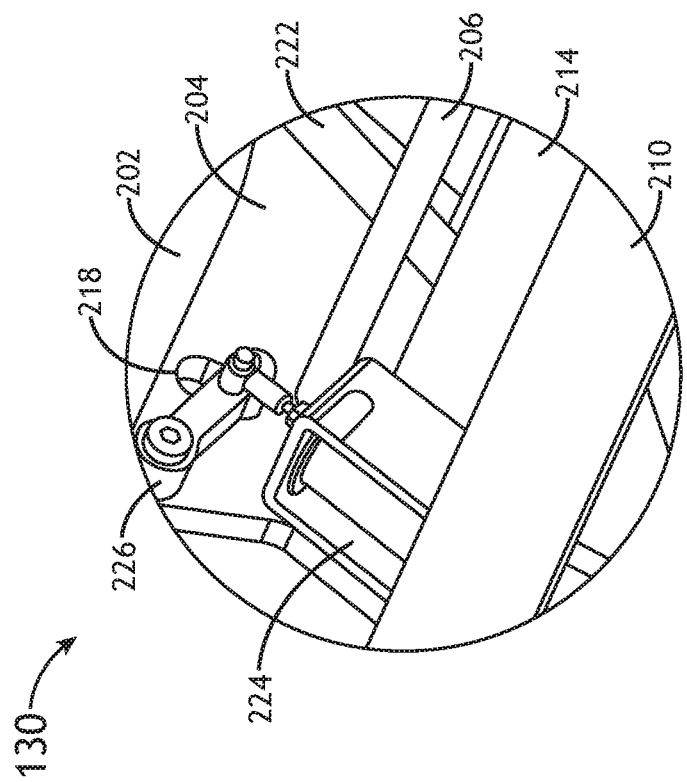
FIG. 2B is a partial perspective view of an exemplary embodiment of a dynamic electro-mechanical ottoman, in accordance with the inventive concepts disclosed herein.

FIGS. 2A-2C illustrate exemplary embodiments of the dynamic electro-mechanical ottoman 130, in accordance with the inventive concepts disclosed herein.

The ottoman 130 may include a cushion assembly 200. The cushion assembly 200 may include a cushion 202. The cushion assembly 200 may include one or more support plates 204 coupled to the cushion 202. For example, where there are multiple support plates 204, the multiple support plates 204 may be coupled together via one or more brace members 206 (e.g., bars, rods, or the like). The cushion assembly 200 may include one or more cross plates 208. For example, where there are multiple cross plates 208, the multiple cross plates 208 may be coupled together via one or more cross members 210 (e.g., bars, rods, or the like).

A cushion sub-assembly 212 including the cushion 202, the one or more support plates 204, and/or the one or more brace members 206 may be rotatable about an axis through a pivot shaft 214 relative to the one or more cross plates 208. For example, the pivot shaft 214 may be coupled to the one or more cross plates 208 via one or more shaft couplers 216 (e.g., shaft flanges, bearing assemblies, brackets, or the like).

Figure 5A:
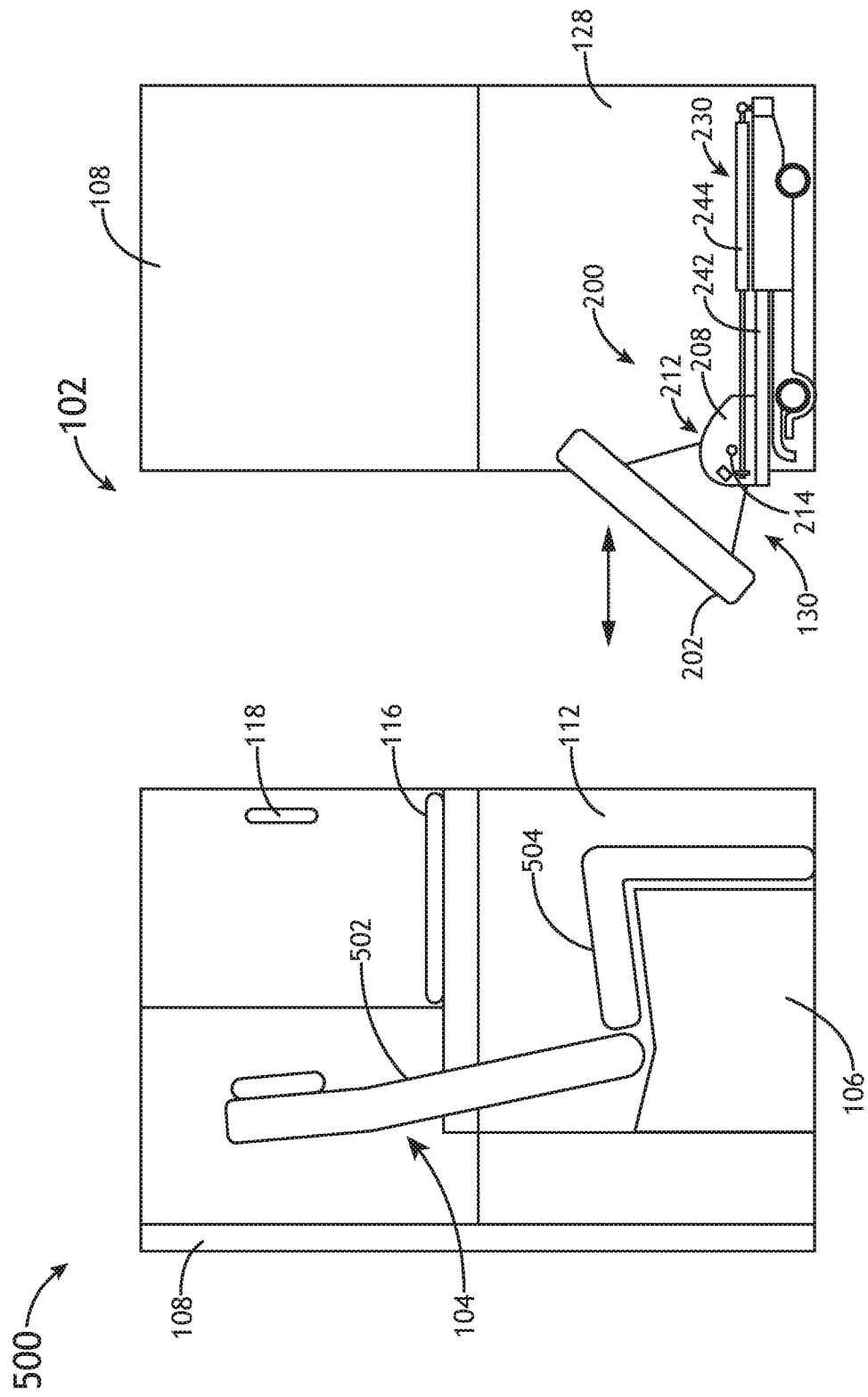
FIG. 5A is a side view of an exemplary embodiment of a passenger compartment including an aircraft seat and a dynamic electro-mechanical ottoman, in accordance with the inventive concepts disclosed herein.

The cushion sub-assembly 212 may be rotatable about an axis through the pivot shaft 214 relative to the one or more cross plates 208 into a position including, but not limited to, an angled or footrest position, a lay-flat or bed position, and/or a storage position (which may or may not be the same as the lay-flat or bed position). For example, the angled or footrest position may include a position where a top surface of the cushion 202 at least partially faces and/or is at least partially oriented toward the aircraft seat 104 (e.g., as illustrated in FIG. 5A). A cross plate 208 may include a groove 218 (e.g., cam) and a support plate 204 may include a protrusion 220 (e.g., cam follower) corresponding to the groove 218. For example, the protrusion 220 may track within the groove 218 while the cushion sub-assembly 212 rotates about the axis through the pivot shaft 214. For instance, the groove 218 may include a stop position corresponding to when the cushion sub-assembly 212 is in an upright position and/or a fully-tilted position. The cushion sub-assembly 212 is fully rotatable within the range provided by the groove 218 and corresponding protrusion 220.

Rotation of the cushion sub-assembly 212 about the axis through the pivot shaft 214 may be at least partially assisted by one or more actuation devices 222. For example, the one or more actuation devices 222 may include, but is not limited to, a gas spring, a mechanical spring, or the like. Rotation of the cushion sub-assembly 212 about the axis through the pivot shaft 214 may be at least partially affected by one or more actuators 224 (e.g., solenoid, servo motor, or the like) coupled to a linkage assembly 226 (e.g., a cam release and clevis assembly, or the like). For example, an end of the linkage assembly 226 may be coupled to the protrusion 220. By way of another example, the one or more actuators 224 may engage the one or more actuation devices 222. For instance, the one or more actuators 224 may be configured to prevent actuation of the one or more actuation devices 222 when engaged. It is noted herein the one or more actuators 224 may be a single mechanical assembly (e.g., an assembly including a cable coupled to the protrusion 220, or the like), such that the linkage assembly 226 may not be integral or required to the cushion assembly 200. Therefore, the above description should not be interpreted as a limitation on the present disclosure but merely an illustration.

The cushion assembly 200 may include a handle or lever 228. For example, as illustrated in FIG. 1C, the handle 228 may be located on a front edge or surface of the cushion 202. For instance, the handle 228 may be reachable from the aircraft seat 104 and/or from an area of the passenger compartment 102 proximate to the aircraft seat 104. The handle 228 may unlock the cushion sub-assembly 212 to allow for rotation of the cushion sub-assembly 212 relative to the one or more cross plates 208 about the axis through the pivot shaft 214. For example, the cushion sub-assembly 212 may be rotated to any desired position within the outer limits (e.g., as defined by the groove 218) when the handle 228 is depressed. By way of another example, the cushion sub-assembly 212 may be locked in the rotated position when the handle 228 is released.

It is noted herein that the rotation of the cushion sub-assembly 212 may position the cushion 202 at an angle relative to the floor of the aircraft cabin 100. For example, the angle may be pre-set by the outer limits of motion as defined by the moveable components of the ottoman 130. By way of another example, the angle may be pre-determined to relieve pressure from behind a passenger's knees and/or in a passenger's thighs when the passenger is in a reclined position, subsequently enhancing comfort.

The ottoman 130 may include a rail assembly 230 coupled to the cushion assembly 200. The rail assembly 230 may include one or more rails 232 and one or more seat tube mounts 234. The one or more rails 232 and the one or more seat tube mounts 234 may be coupled together via one or more rail supports 236. The one or more seat tube mounts 234 may be coupled to one or more seat tubes 238. For example, the one or more seat tubes 238 may be positioned perpendicular (e.g., cross-wise) to a direction of travel of the cushion assembly 200 relative to the rail assembly 230. The rail assembly 230 may be supported by one or more feet 240. For example, the one or more feet 240 may be coupled to the one or more seat tube mounts 234. By way of another example, the one or more feet 240 may be adjustable.

The rail assembly 230 may be coupled to one or more floor fittings within a floor of the aircraft cabin 100. For example, the one or more seat tubes 238 and/or the one or more feet 240 may be coupled to the one or more floor fittings within the floor of the aircraft cabin 100, either directly or indirectly (e.g., via one or more intermediary components). The rail assembly 230 may be coupled to one or more components of the passenger compartment 102 (e.g., the one or more bulkheads 108). For example, the one or more seat tubes 238 may be coupled to the one or more components of the passenger compartment 102 (e.g., the one or more bulkheads 108), either directly or indirectly (e.g., via one or more intermediary components).

The rail assembly 230 may include one or more actuatable tracks 242. For example, the one or more actuatable tracks 242 may be coupled to the one or more rails 232 and the one or more cross plates 208 of the cushion assembly 200. The cushion assembly 200 may be translatable (e.g., slidable or trackable) along an axis length-wise relative to the aviation environment 100 via the one or more actuatable tracks 242 into a position including, but not limited to, a fore position, an aft position, or the like. The cushion assembly 200 may be translatable (e.g., slidable) along an axis length-wise relative to the aviation environment 100 via the one or more actuatable tracks 242 into a position including, but not limited to, a footrest position (e.g., a tilted footrest position), a lay-flat or bed position, and/or a storage position (which may or may not be the same as the lay-flat or bed position).

Translation of the cushion assembly 200 via the one or more actuatable tracks 242 may be at least partially assisted by one or more actuation devices 244. For example, the one or more actuation devices 244 may be coupled to the one or more rails 232 and the one or more cross plates 208 of the cushion assembly 200. By way of another example, the one or more actuation devices 244 may include, but are not limited to, a gas spring, a mechanical spring, or the like. It is noted herein, however, that the one or more actuation devices 244 may include one or more mechanical assemblies driven by an actuator such as, but not limited to, one or more gear assemblies (e.g., a worm gear-and-wheel assembly, a rack-and-pinion assembly, or the like), one or more chain-and-sprocket assemblies, one or more belt-and-pulley assemblies, or the like.

Translation of the cushion assembly 200 via the one or more actuatable tracks 242 may be at least partially driven by one or more actuators 246 (e.g., solenoid, servo motor, or the like) coupled to a linkage assembly 248 (e.g., a pivot plate and pivot pin assembly, or the like). For example, a portion of the linkage assembly 248 may be coupled to and/or engage a portion of the one or more actuators 246 and/or a portion of the one or more actuation devices 244 (e.g., a head of a piston rod of a gas spring). For instance, the portion of the linkage assembly 248 may be coupled to and/or engage a portion of the one or more actuation devices 244 (e.g., a head of a piston rod of a gas spring) proximate to one or more couplers 250, where the one or more couplers 250 may be configured to prevent actuation of the one or more actuation devices 244 when engaged. It is noted herein the one or more actuators 246 may be a single mechanical assembly (e.g., an assembly including a cable coupled to the protrusion 220, or the like), such that the linkage assembly 248 may not be integral or required to the rail assembly 230. Therefore, the above description should not be interpreted as a limitation on the present disclosure but merely an illustration.

Figure 3:
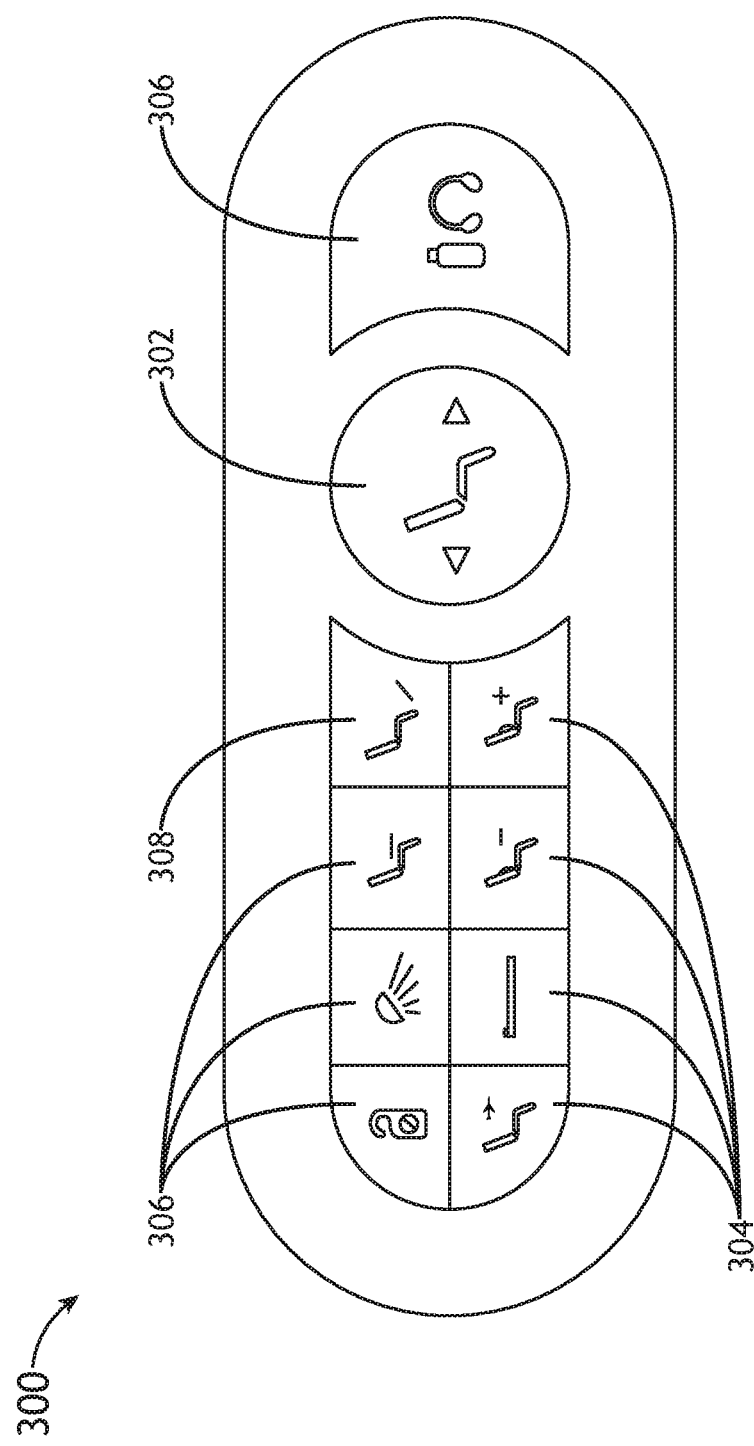
FIG. 3 is a side view of an exemplary embodiment of a passenger control unit for a passenger compartment including an aircraft seat and a dynamic electro-mechanical ottoman, in accordance with the inventive concepts disclosed herein.

FIG. 3 is a side view of an exemplary embodiment of a passenger control unit 300 for the passenger compartment 102 including the aircraft seat 104 and the dynamic electro-mechanical ottoman 130, in accordance with the inventive concepts disclosed herein.

The passenger control unit 300 may be coupled to a surface within the passenger compartment 102 (e.g., the passenger compartment 102 illustrated in FIGS. 1A-1C). For example, the passenger control unit 300 may be mounted on or at least partially inset within a surface of the aircraft seat 104 or the ottoman 130 (e.g., the aircraft seat 104 and the ottoman 130 illustrated in FIGS. 1A-1C). By way of another example, the passenger control unit 300 may be mounted on a surface or at least partially inset within of a bulkhead 108 or a monument 112 (e.g., the bulkhead 108 and the monument 112 illustrated in FIGS. 1A-1C).

The passenger control unit 300 may include one or more seat toggle switches 302. For example, a seat toggle switch 302 of the one or more seat toggle switches 302 may be configured to translate the aircraft seat 104 fore and/or aft, where the aircraft seat 104 is fully positionable via translation between the outer limits of motion as defined by the moveable components of the aircraft seat 104.

The passenger control unit 300 may include one or more seat switches 304. For example, a switch 304 of the one or more seat switches 304 may be configured to recline or raise the aircraft seat 104, where the aircraft seat 104 is fully positionable via rotation between the outer limits of motion as defined by the moveable components of the aircraft seat 104. By way of another example, a switch 304 of the one or more seat switches 304 may be configured to re-position the aircraft seat 104 into a lay-flat position. By way of another example, a switch 304 of the one or more seat switches 304 may be configured to re-position the aircraft seat 104 into the upright position (e.g., a TTOL position).

The passenger control unit 300 may include one or more passenger compartment switches 306. For example, a switch 306 of the one or more passenger compartment switches 306 may toggle the one or more lights 118 (e.g., the lights 118 illustrated in FIGS. 1B and 1C). By way of another example, a switch 306 of the one or more passenger compartment switches 306 may signal to cabin crew that the passenger does not wish to be disturbed for a period of the flight. It is noted herein the one or more passenger compartment switches 306 may be a cover or dust plug for one or more electronics connectors including, but not limited to, one or more headphone jacks, one or more universal serial bus (USB) ports, one or more power outlets, or the like.

The passenger control unit 300 may include one or more ottoman switches 308. Depressing an ottoman switch 308 of the one or more ottoman switches 308 may unlock the capability of the ottoman 130 to linearly translate, where the ottoman 130 is fully positionable via translation between the outer limits of motion as defined by the moveable components of the ottoman 130. For example, depressing the one or more ottoman switches 308 may unlock the ability for the cushion assembly 200 to linearly translate (e.g., travel fore and/or aft) relative to the rail assembly 230 via the one or more actuatable tracks 242 and/or the one or more actuation devices 244 (e.g., the actuatable tracks 242 and the actuation devices 244 illustrated in FIGS. 2A-2C). For instance, the cushion assembly 200 may travel towards a passenger (e.g., in an aft direction) when an ottoman switch 308 is depressed via assistance by the one or more actuation devices 244 (e.g., the actuation devices 244 illustrated in FIGS. 2A and 2C) In addition, the cushion assembly 200 may travel away from a passenger (e.g., in a fore direction) when an ottoman switch 308 is depressed via assistance by the passenger (e.g., by the passenger pushing against the cushion 202 of the cushion assembly 200, the cushion 202 illustrated in FIG. 2A).

It is noted herein that depressing an ottoman switch 308 of the one or more ottoman switches 308 may unlock the capability of the ottoman 130 to rotate, where the ottoman 130 is fully positionable via rotation between the outer limits of motion as defined by the moveable components of the ottoman 130. In this regard, the handle 228 may not be integral or required to the present invention.

The ottoman 130 may be configured to linearly translate only when the cushion sub-assembly 212 is rotated about the axis through the pivot shaft 214 relative to the one or more cross plates 208 (e.g., the cross plates 208 illustrated in FIGS. 2A-2C). For example, the one or more actuators 224 may prevent the linear translation of the cushion assembly 200 relative to the rail assembly 230 unless the cushion sub-assembly 212 is rotated about the axis through the pivot shaft 214 relative to the one or more cross plates 208 (e.g., the cross plates 208 illustrated in FIGS. 2A-2C). In this regard, the ottoman 130 may be locked in place when not rotated (e.g., to prevent a possible translation when in a storage or lay-flat position. It is noted herein, however, that the ottoman 130 may be configured to independently rotate and/or linearly translate. Therefore, the above description should not be interpreted as a limitation on the present disclosure but merely an illustration.

Figure 4:
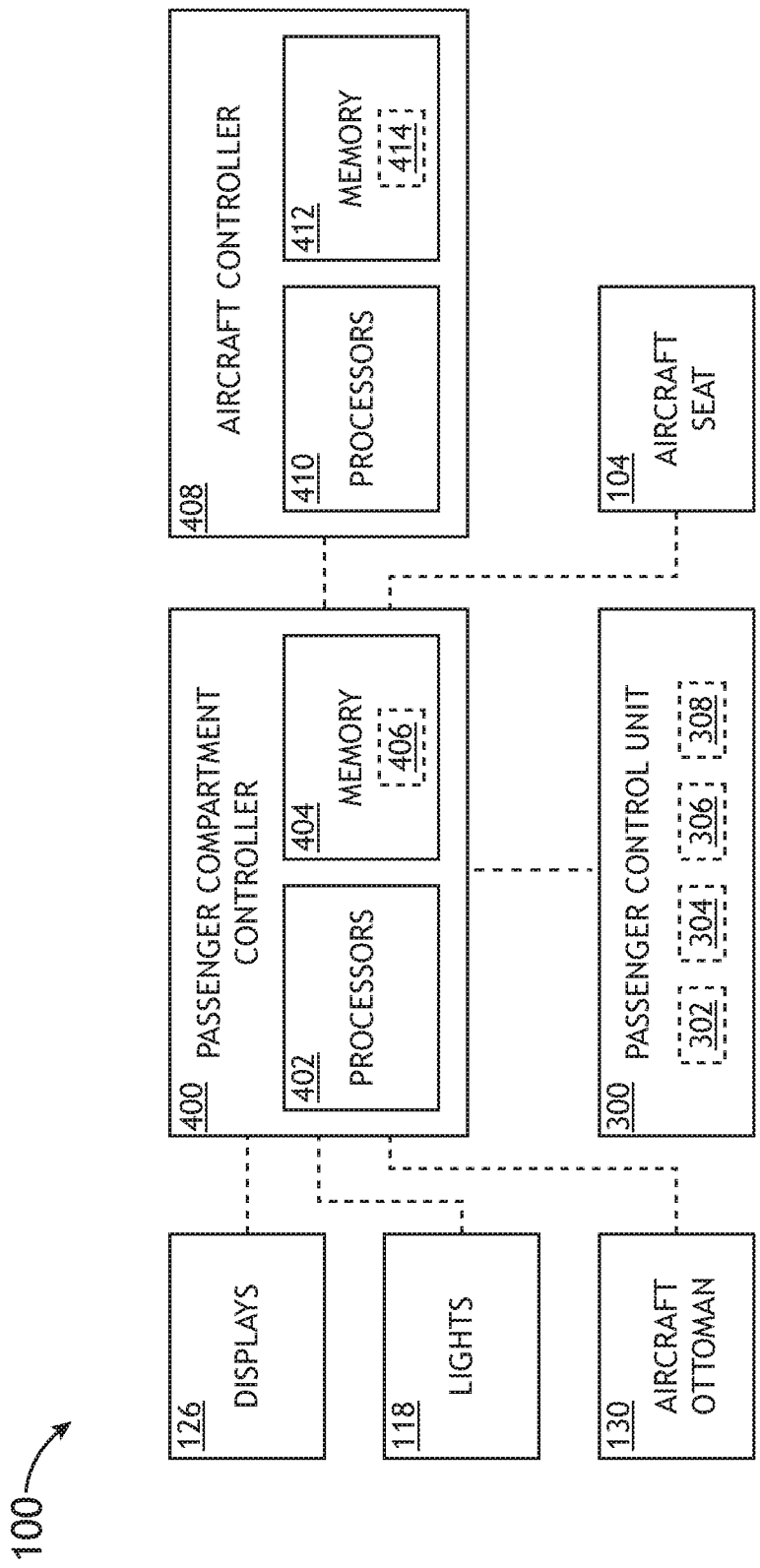
FIG. 4 is a block diagram of an exemplary embodiment of an aviation environment in which an aircraft seat and a dynamic electro-mechanical ottoman may be implemented, in accordance with the inventive concepts disclosed herein.

FIG. 4 is a block diagram of an exemplary embodiment of the aircraft cabin 100 in which the aircraft seat 104 and the dynamic electro-mechanical ottoman 130 may be implemented, in accordance with the inventive concepts disclosed herein.

The system 100 may include one or more passenger compartment controllers 400 (e.g., within the passenger compartment 102, the passenger compartment 102 illustrated in FIGS. 1A-1C). The one or more passenger compartment controllers 400 may include one or more processors 402 and memory 404. The memory 404 may store one or more sets of program instructions 406. The one or more processors 402 may be configured to execute the one or more sets of program instructions 406 to carry out one or more of the various steps described throughout the present disclosure.

The one or more passenger compartment controllers 400 may be coupled (e.g., physically and/or communicatively coupled) to the one or more displays 126, the one or more lights 118, the aircraft seat 104, the aircraft ottoman 130 (e.g., the cushion assembly 200 and/or the rail assembly 230), and/or the passenger control unit 300. For example, one or more signals may be transmitted and/or received between the one or more passenger compartment controllers 400 and the one or more displays 126, the one or more lights 118, the aircraft seat 104, the aircraft ottoman 130 (e.g., the cushion assembly 200 and/or the rail assembly 230), and/or the passenger control unit 300. For instance, a signal may be generated via the toggling of a switch 302 and/or a pressing of a switch 304, 306, 308 on the passenger control unit 300, which may be received and processed by the one or more passenger compartment controllers 400. The one or more passenger compartment controllers 400 may then transmit the processed one or more signals to an intended end point (e.g., the one or more displays 126, the one or more lights 118, the aircraft seat 104, the aircraft ottoman 130, and/or the passenger control unit 300).

It is noted herein that the passenger control unit 300 may be considered to be at least a portion of the one or more passenger compartment controllers 400. For example, the passenger control unit 300 may be a component of the one or more passenger compartment controllers 400. By way of another example, the passenger control unit 300 may be integrated within the one or more passenger compartment controllers 400. In addition, it is noted herein that the passenger control unit 300 may be considered to include and/or be a passenger seat control unit, for purposes of the present disclosure.

The system 100 may include one or more aircraft controllers 408. The one or more aircraft controllers 408 may include one or more processors 410 and memory 412. The memory 412 may store one or more sets of program instructions 414. The one or more processors 410 may be configured to execute the one or more sets of program instructions 414 to carry out one or more of the various steps described throughout the present disclosure.

The one or more processors 402, 410 may include any one or more processing elements known in the art. In this sense, the one or more processors 402, 410 may include any microprocessor device configured to execute algorithms and/or program instructions. In general, the term "processor" may be broadly defined to encompass any device having one or more processing elements, which execute a set of program instructions from a non-transitory memory medium (e.g., the memory 404, 412), where the one or more sets of program instructions 406, 414 is configured to cause the one or more processors 402, 410 to carry out any of one or more process steps.

The memory 404, 412 may include any storage medium known in the art suitable for storing the one or more sets of program instructions 406, 414 executable by the associated one or more processors 402, 410. For example, the memory 404, 412 may include a non-transitory memory medium. For instance, the memory 404, 412 may include, but is not limited to, a read-only memory (ROM), a random access memory (RAM), a magnetic or optical memory device (e.g., disk), a magnetic tape, a solid state drive, and the like. The memory 404, 412 may be configured to provide display information to the display device (e.g., the one or more displays 126). In addition, the memory 404, 412 may be configured to store user input information from a user input device. The memory 404, 412 may be housed in a common controller housing with the one or more processors 402, 410. The memory 404, 412 may, alternatively or in addition, be located remotely with respect to the spatial location of the processors 402, 410, the one or more passenger compartment controllers 400 and/or the one or more aircraft controllers 408. For instance, the one or more processors 402, 410, the one or more passenger compartment controllers 400, and/or the one or more aircraft controllers 408 may access a remote memory 404, 412 (e.g., server), accessible through a network (e.g., internet, intranet, and the like) via one or more communication interfaces.

The one or more passenger compartment controllers 400 and/or the one or more aircraft controllers 408 may be configured to receive and/or acquire data or information from other systems or tools via the one or more communication interfaces that may include wireline and/or wireless portions. In addition, the one or more passenger compartment controllers 400 and/or the one or more aircraft controllers 408 may be configured to transmit data or information (e.g., the output of one or more procedures of the inventive concepts disclosed herein) to one or more systems or tools via the one or more communication interfaces that may include wireline and/or wireless portions. In this regard, the transmission medium may serve as a data link between the one or more passenger compartment controllers 400, the one or more aircraft controllers 408, and/or other subsystems. In addition, the one or more passenger compartment controllers 400 and/or the one or more aircraft controllers 408 may be configured to send data to external systems via a transmission medium (e.g., network connection).

Although the present disclosure is directed to the one or more passenger compartment controllers 400 and the one or more aircraft controllers 408 being separate, it is noted herein the one or more passenger compartment controllers 400 and the one or more aircraft controllers 408 may be the same and/or share select components. Therefore, the above description should not be interpreted as a limitation on the present disclosure but merely an illustration.

The one or more displays 126 may include any display device known in the art. For example, the one or more displays 126 may include, but are not limited to, a liquid crystal display (LCD), a light-emitting diode (LED) based display, an organic light-emitting diode (OLED) based display, an electroluminescent display (ELD), an electronic paper (E-ink) display, a plasma display panel (PDP), a display light processing (DLP) display, a cathode-ray tube (CRT), or the like. Those skilled in the art should recognize that a variety of display devices may be suitable for implementation in the present invention and the particular choice of display device may depend on a variety of factors, including, but not limited to, form factor, cost, and the like. In a general sense, any display device capable of integration with the user input device (e.g., touchscreen, bezel mounted interface, keyboard, mouse, trackpad, and the like) is suitable for implementation in the present invention.

The one or more input devices may include any user input device known in the art. For example, the one or more input devices may include, but are not limited to, a keyboard, a keypad, a touchscreen, a lever, a knob, a scroll wheel, a track ball, a switch, a dial, a sliding bar, a scroll bar, a slide, a handle, a touch pad, a paddle, a steering wheel, a joystick, a bezel input device, or the like. In the case of a touchscreen interface, those skilled in the art should recognize that a large number of touchscreen interfaces may be suitable for implementation in the present invention. For instance, the one or more displays 126 may be integrated with a touchscreen interface, such as, but not limited to, a capacitive touchscreen, a resistive touchscreen, a surface acoustic based touchscreen, an infrared based touchscreen, or the like. In a general sense, any touchscreen interface capable of integration with the display portion of a display device is suitable for implementation in the present invention. In another embodiment, the input devices may include, but is not limited to, a bezel mounted interface.

Although embodiments of the present disclosure are directed to the one or more displays 126 being indirectly coupled to the corresponding one or more input devices indirectly (e.g., via the one or more passenger compartment controllers 400 and/or the one or more aircraft controllers 408), it is noted herein the one or more displays 126 may be directly coupled to the corresponding one or more input devices. For example, the one or more displays 126 may be housed with the one or more input devices in a common user interface housing. Therefore, the above description should not be interpreted as a limitation on the present disclosure but merely an illustration.

It is noted herein that coupling the aircraft seat 104 and the ottoman 130 to the one or more passenger compartment controllers 400 (e.g., coupling the one or more actuators 224, 246) may allow for synchronized motion between the aircraft seat 104 and the ottoman 130. For example, the ottoman 130 may return to the bed position when the aircraft seat 104 travels to lay-flat or bed mode. In this regard, the cushion 202 may add to the length of the sleeping surface generated by the aircraft seat 104 when in the lay-flat position. In addition, in this regard the possibility of a collision between the aircraft seat 104 and the ottoman 130 is reduced.

FIGS. 5A-5D illustrate a side view of an exemplary embodiment of the passenger compartment 102 including the aircraft seat 104 and the dynamic electro-mechanical ottoman 130, in accordance with the inventive concepts disclosed herein.

FIG. 5A illustrates an operational state 500, in accordance with the inventive concepts disclosed herein. In the operational state 500, the aircraft seat 104 may be in an upright or raised position and the ottoman 130 may be in a rotated position and a translated position.

The cushion sub-assembly 212 may be rotated about the axis through the pivot shaft 214 relative to the one or more cross plates 208 toward the aircraft seat 104. It is noted herein the cushion assembly 200 may be rotated following a depressing of the handle 228, and may be positioned following a release of the handle 228 (e.g., the handle 228 illustrated in FIG. 1C).

The cushion assembly 200 may be translated via an extension of the one or more actuatable tracks 242 and the one or more actuation devices 244, such that the cushion assembly 200 may be extended relative to the rail assembly 230 a select distance from a storage or bed position and toward the aircraft seat 104). It is noted herein the cushion assembly 200 may be translated following the depressing of the one or more ottoman switches 308 (e.g., the ottoman switches 308 illustrated in FIG. 3).

The cushion assembly 200 may be translatable between the fore position and the aft position via an applied force, while the cushion sub-assembly 212 remains in a rotated position relative to the one or more cross plates 208. For example, the cushion assembly 200 may be translatable between the fore position and the aft position via a force applied by one or more actuation devices 222 (e.g., a gas spring, or the like). By way of another example, the cushion assembly 200 may be translatable between the aft position and the fore position via a force applied by a passenger to the cushion 202.

Figure 5B:
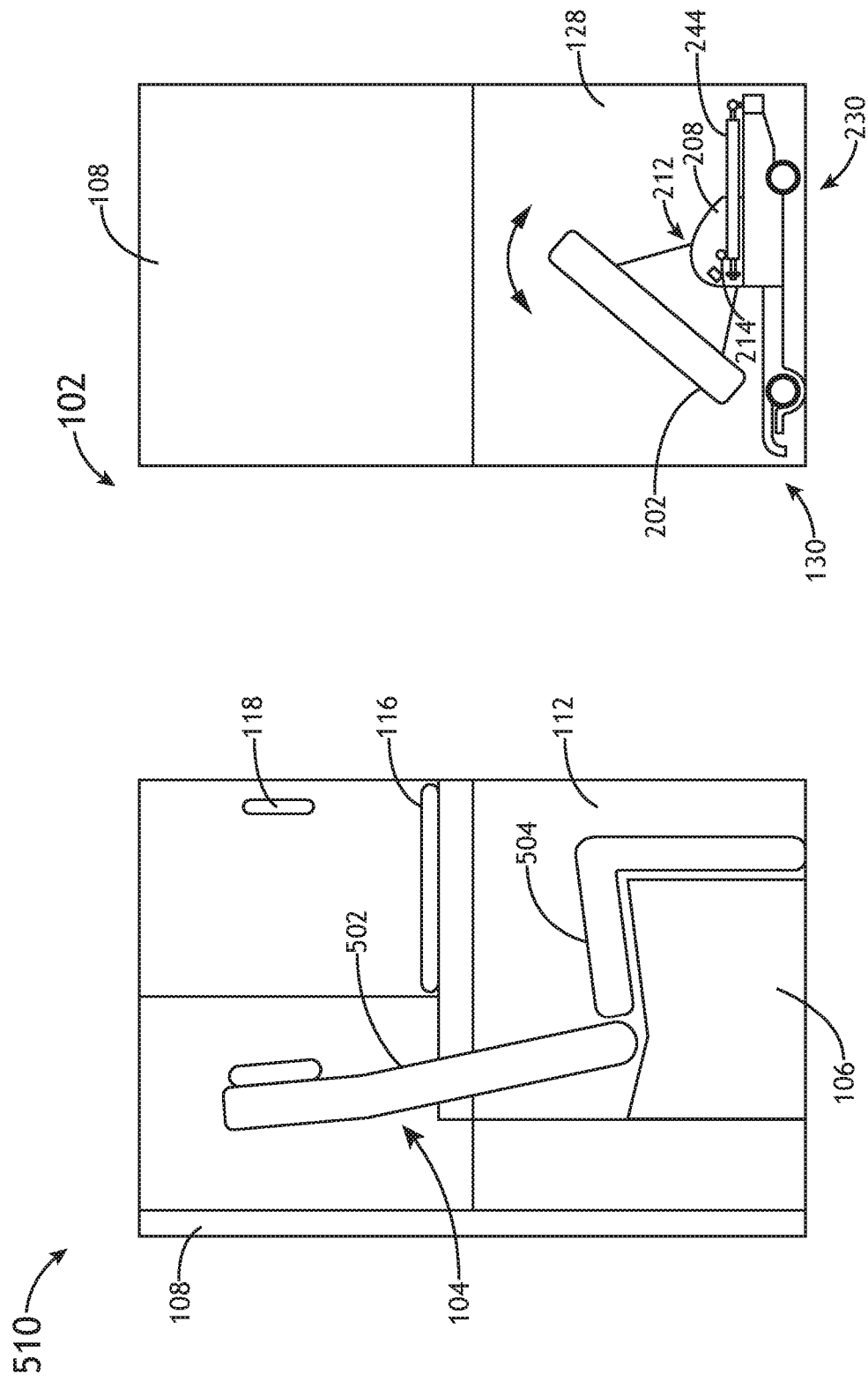
FIG. 5B is a side view of an exemplary embodiment of a passenger compartment including an aircraft seat and a dynamic electro-mechanical ottoman, in accordance with the inventive concepts disclosed herein.

FIG. 5B illustrates an operational state 510, in accordance with the inventive concepts disclosed herein. In the operational state 510, the aircraft seat 104 may be in a raised position and the ottoman 130 may be in a rotated position and a non-translated position.

The cushion sub-assembly 212 may be rotated about the axis through the pivot shaft 214 relative to the one or more cross plates 208 toward the aircraft seat 104. It is noted herein the cushion assembly 200 may be rotated following a depressing of the handle 228, and may be positioned following a release of the handle 228 (e.g., the handle 228 illustrated in FIG. 1C). The cushion assembly 200 may be in a non-translated position (e.g., a storage or bed position) when the one or more actuatable tracks 242 and the one or more actuation devices 244 are not extended.

FIG. 5C illustrates an operational state 520, in accordance with the inventive concepts disclosed herein. In the operational state 520, the aircraft seat 104 may be in a raised position and the ottoman 130 may be in a storage or bed position and a non-translated position.

The aircraft seat 104 may be rotatable and/or translatable between an upright or reclined position and a lay-flat position. For example, the aircraft seat 104 may be rotatable about an axis cross-wise through the aircraft seat 104 such that a seat back cushion 502 and a seat cushion 504 may be rotatable between the upright or reclined position and the lay-flat position. It is noted herein the aircraft seat 104 may be rotatable and/or translatable via the depressing of the one or more seat switches 304 (e.g., the seat switches 304 illustrated in FIG. 3).

It is noted herein the upright position of the aircraft seat 104 in FIGS. 5A-5C may be considered an example illustration of a TTOL position, for purposes of the present disclosure.

Figure 5D:
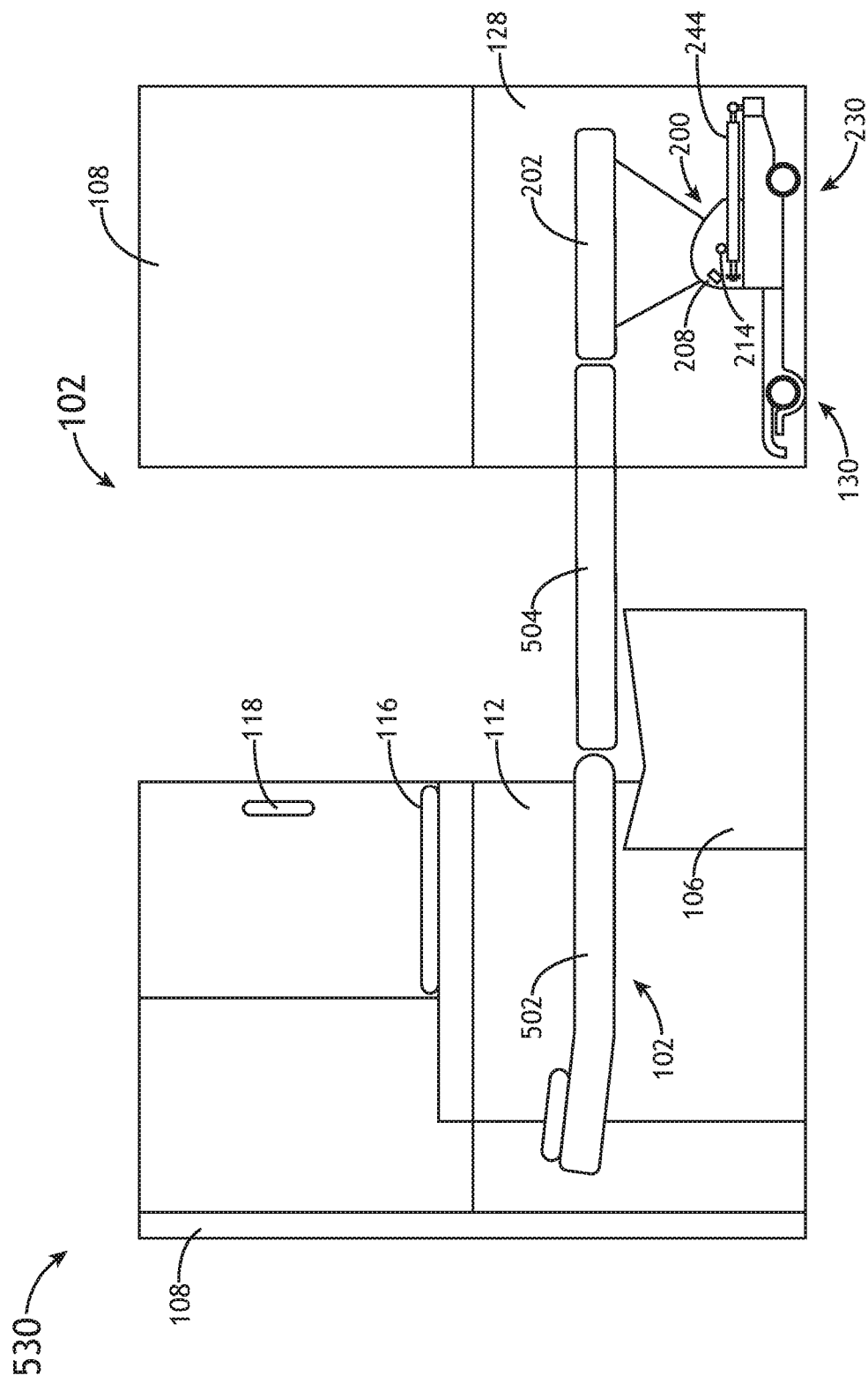
FIG. 5D is a side view of an exemplary embodiment of a passenger compartment including an aircraft seat and a dynamic electro-mechanical ottoman, in accordance with the inventive concepts disclosed herein.

FIG. 5D illustrates an operational state 530, in accordance with the inventive concepts disclosed herein. In the operational state 530, the aircraft seat 104 may be in the lay-flat position and the ottoman 130 may be in the stowage or bed position.

The cushions 202, 502, 504 may share an aligned axis when the aircraft seat 104 is in the lay-flat position and the ottoman 130 is in the bed position. The cushions, 202, 502, 504 may be in contact (e.g., do not include a gap or separation) when the aircraft seat 104 is in the lay-flat position and the ottoman 130 is in the bed position. It is noted herein, however, that at least a back surface or edge (e.g., an aft surface or edge) of the ottoman 130 may be spaced a selected distance from a front surface or edge (e.g., a fore surface of edge) of the aircraft seat 104. In this regard, the ottoman cushion 202 and the aircraft seat cushions 502, 504 may be configured to provide a continuous sleeping surface for a passenger within the aircraft passenger compartment 102.

Although the present disclosure is directed to progressing from the operational state 500 including an upright aircraft seat 104 with translated and rotated ottoman 130 to the operational state 530 with the aircraft seat 104 in the lay-flat position and the ottoman 130 in the bed position (e.g., as illustrated in FIGS. 5A-5D), it is noted herein the operational states 500, 510, 520, 530 may be entered and/or exited in any order or arrangement. In addition, it is noted herein the aircraft seat 104 and the ottoman 130 are not limited to the positions in the operational states 500, 510, 520, 530 (e.g., as illustrated in FIGS. 5A-5D). Therefore, the above description should not be interpreted as a limitation on the present disclosure but merely an illustration.

As will be appreciated from the above embodiments, the inventive concepts disclosed herein are directed to a dynamic electro-mechanical ottoman configured to be positionable relative to a passenger in a convertible aircraft seat, where the positioning may be dependent on a movement and/or location of the convertible aircraft seat.

It is to be understood that embodiments of the methods in accordance with the inventive concepts disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to, one or more of the steps disclosed herein.

From the above description, it is clear that the inventive concepts disclosed herein are well adapted to carry out the objects and to attain the advantages mentioned herein as well as those inherent in the inventive concepts disclosed herein. While presently preferred embodiments of the inventive concepts disclosed herein have been described for purposes of this disclosure, it will be understood that numerous changes may be made which will readily suggest themselves to those skilled in the art and which are accomplished within the broad scope and coverage of the inventive concepts disclosed and claimed herein.

What is claimed:

1. A passenger compartment for an aircraft, the passenger compartment comprising:
   an aircraft seat and
   a dynamic electro-mechanical ottoman, the dynamic electro-mechanical ottoman comprising:
      a rail assembly comprising:
         one or more rails; and
         one or more actuatable tracks coupled to the one or more rails; and
      a cushion assembly translatable via the one or more actuatable tracks between a first translation position and a second translation position, the cushion assembly comprising:
         one or more cross plates coupled to the one or more actuatable tracks;
         a pivot shaft coupled to the one or more cross plates; and
         a cushion sub-assembly comprising:
            one or more support plates coupled to the pivot shaft; and
            a planar cushion coupled to the one or more support plates,
         the cushion sub-assembly rotatable about an axis through the pivot shaft between a first rotation position and a second rotation position to actuate a first edge of the planar cushion in a downward direction and a second edge of the planar cushion in an upward direction, the first edge of the planar cushion at least partially facing the aircraft seat when in the first rotation position, the first edge of the planar cushion at least partially facing a floor of an aircraft cabin when in the second rotation position, the second edge of the planar cushion at least partially facing a portion of a set of bulkheads of the passenger compartment when in the first rotation position,
            a top planar surface of the planar cushion at least partially facing the aircraft seat when the cushion sub-assembly is in the second rotation position.

2. The passenger compartment of claim 1, the cushion sub-assembly further comprising:
   a handle, the cushion sub-assembly rotatable about the axis through the pivot shaft between the first rotation position and the second rotation position when the handle is depressed.

3. The passenger compartment of claim 2, the cushion sub-assembly further comprising:
   one or more actuation devices configured to assist the cushion sub-assembly during rotation about the axis through the pivot shaft between the first rotation position and the second rotation position when the handle is depressed.

4. The passenger compartment of claim 3, the cushion sub-assembly further comprising:
   one or more actuators configured to prevent the cushion sub-assembly from rotating about the axis through the pivot shaft between the first rotation position and the second rotation position when the handle is not depressed.

5. The passenger compartment of claim 1, further comprising a passenger control unit communicatively coupled to at least one of the rail assembly or the cushion assembly.

6. The passenger compartment of claim 5, the cushion assembly translatable between the first translation position and the second translation position when a switch on the passenger control unit is depressed.

7. The passenger compartment of claim 6, the rail assembly further comprising:
   one or more actuation devices configured to assist the cushion assembly during translation between the first translation position and the second translation position when the switch on the passenger control unit is depressed.

8. The passenger compartment of claim 6, the rail assembly further comprising:
   one or more actuators configured to prevent the cushion assembly from translating between the first translation position and the second translation position when the switch on the passenger control unit is not depressed.

9. The passenger compartment of claim 5, further comprising a controller communicatively coupled to the passenger control unit, the controller configured to receive one or more signals from the passenger control unit, the controller comprising one or more processors and memory configured to store one or more sets of program instructions, the one or more processors being configured to execute the one or more sets of program instructions.

10. The passenger compartment of claim 9, the controller configured to transmit the one or more signals received from the passenger control unit to at least one of the aircraft seat, the rail assembly, or the cushion assembly.

11. The passenger compartment of claim 10, the aircraft seat being translatable between a first seat translation position and a second seat translation position when a switch on the passenger control unit is toggled, the aircraft seat being rotatable between a first seat rotation position and a second seat rotation position when a switch on the passenger control unit is depressed.

12. The passenger compartment of claim 11, the first rotation position of the cushion assembly comprising a bed position, the second rotation position of the cushion assembly comprising a footrest position.

13. The passenger compartment of claim 12, the first translation position of the cushion assembly comprising a fore position away from the aircraft seat, the second translation position of the cushion assembly comprising an aft position toward the aircraft seat.

14. The passenger compartment of claim 13, the first seat rotation position comprising a lay-flat position, the second seat rotation position comprising an upright position or a reclined position.

15. The passenger compartment of claim 14, the aircraft seat comprising a seat back cushion and a seat cushion,
   the seat back cushion, the seat cushion, and the planar cushion configured to form a sleeping surface when the aircraft seat is in the lay-flat position and the cushion assembly is in the bed position and the fore position.

16. The passenger compartment of claim 15, the cushion assembly configured to translate into the fore position and rotate into the bed position when the aircraft seat rotates into the lay-flat position.

17. The passenger compartment of claim 16, the controller configured to cause the cushion assembly to translate into the fore position and rotate into the bed position when the aircraft seat rotates into the lay-flat position.

18. The passenger compartment of claim 1, the cushion assembly being translatable between the second translation position and the first translation position via a force applied to the top surface of the cushion assembly.

\* \* \* \* \*